United States Patent
Suzuki et al.

(10) Patent No.: US 7,976,058 B2
(45) Date of Patent: Jul. 12, 2011

(54) OCCUPANT PROTECTION SYSTEM

(75) Inventors: Shigeyuki Suzuki, Aichi-ken (JP); Takaki Fukuyama, Aichi-ken (JP); Kenji Hayakawa, Aichi-ken (JP); Tsukasa Sugiyama, Aichi-ken (JP); Michio Inoue, Aichi-ken (JP); Hirokazu Matsuura, Aichi-ken (JP); Hajime Kitte, Aichi-ken (JP); Takeki Hayashi, Aichi-ken (JP); Masashi Aoki, Aichi-ken (JP); Hitoshi Ida, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 135 days.

(21) Appl. No.: 12/382,769

(22) Filed: Mar. 24, 2009

(65) Prior Publication Data
US 2009/0243268 A1      Oct. 1, 2009

(30) Foreign Application Priority Data

Mar. 28, 2008 (JP) ................................ 2008-086719

(51) Int. Cl.
*B60R 21/207* (2006.01)
*B60R 21/21* (2011.01)
(52) U.S. Cl. .................................... 280/729; 280/730.2
(58) Field of Classification Search .................. 280/729, 280/730.1, 730.2, 743.1, 743.2, 748, 749
See application file for complete search history.

(56) References Cited

U.S. PATENT DOCUMENTS

| | | | | |
|---|---|---|---|---|
| 5,172,790 A * | 12/1992 | Ishikawa et al. | ............... | 180/268 |
| 5,499,840 A * | 3/1996 | Nakano | ...................... | 280/730.1 |
| 5,556,128 A * | 9/1996 | Sinnhuber et al. | ......... | 280/730.2 |
| 6,209,910 B1 * | 4/2001 | Nagae | ............................ | 280/735 |
| 6,561,539 B1 * | 5/2003 | Sunabashiri et al. | ...... | 280/730.1 |
| 6,773,026 B2 * | 8/2004 | Meyer | ............................ | 280/729 |
| 6,966,576 B1 * | 11/2005 | Greenstein | ................ | 280/730.1 |
| RE39,629 E * | 5/2007 | Yamaji et al. | ................ | 280/730.2 |
| 7,222,877 B2 * | 5/2007 | Wipasuramonton et al. | ........................... | 280/730.1 |
| 7,594,675 B2 * | 9/2009 | Bostrom et al. | ........... | 280/730.2 |
| 2002/0020992 A1 * | 2/2002 | Kanuma | .................... | 280/730.2 |
| 2006/0175813 A1 * | 8/2006 | Heudorfer et al. | ......... | 280/730.2 |
| 2007/0096444 A1 | 5/2007 | Bostrom et al. | | |

FOREIGN PATENT DOCUMENTS

| | | |
|---|---|---|
| JP | 3-108564 U | 11/1991 |
| JP | 07-267037 A | 10/1995 |
| JP | 2006-524161 A | 10/2006 |
| WO | WO 2006128591 A1 * | 12/2006 |

* cited by examiner

*Primary Examiner* — Paul N Dickson
*Assistant Examiner* — Joseph Rocca
(74) *Attorney, Agent, or Firm* — Posz Law Group, PLC

(57) ABSTRACT

The occupant protection system includes a catching body that is housed in a housing located between a near-by seat and a distant seat for upward deployment and a support body that supports the catching body. The catching body covers the impact side of a distant-side occupant to catch the occupant moving toward the impacted lateral and includes a distal end acting as a free end swingable in a left and right direction. The support body is located on a side of the near-by seat close to the impacted lateral for deployment to support the catching body when the catching body swings toward the impacted lateral after receiving the distant-side occupant.

6 Claims, 15 Drawing Sheets

OCCUPANT PROTECTION SYSTEM

The present application claims priority from Japanese Patent Application No. 2008-86719 of Suzuki et. al., filed on Mar. 28, 2008, the disclosure of which is hereby incorporated into the present application by reference.

BACKGROUND OF THE INVENTION

1. Field of the Invention

The present invention relates to an occupant protection system that is mountable on a vehicle having a row of seats arranged along a left and right direction and protects an occupant seated away from the side of vehicle which has been impacted.

2. Description of the Related Art

JP 3-108564, JP 7-267037 and JP 2006-524161 respectively disclose an occupant protection system that includes on both sides of each of two seats arranged in a left and right direction airbags deployable forward in such a manner as to cover both laterals of the seats.

An occupant protection system described in JP 3-108564 includes on both sides of a seat each one airbag deployable when a vehicle is impacted on a lateral. Occupant protection systems disclosed in JP 7-267037 and JP 2006-524161 respectively include on both sides of two seats each one airbag as well, but out of the airbags, only those located on the side of each of the seats close to the impacted lateral are deployable.

When a vehicle is impacted on a lateral, an occupant seated on a seat is subjected to an inertia force acting toward the impacted lateral. If an occupant seated on a distant seat which is located furthest from the impacted lateral wears a three-point seat belt, the seat belt restrains from the shoulder facing away from the impacted lateral to the pelvis facing the impacted lateral, of the occupant. With this arrangement the seat belt cannot prevent the occupant seated away from the impacted lateral from moving toward the impacted lateral when subjected to inertia heading toward the impacted lateral.

Moreover, in all of the above references, distal ends of the airbags are configured as free ends that are swingable in a left and right direction. That is, the airbags are, configured to deploy forward so as to cover sides of the seat, while leaving distal ends thereof free for swinging. If the airbag having deployed is swingable in a left and right direction at the end, the possibility will be that the airbag swings to the left or right upon receiving an occupant undergoing inertia and moving toward the impacted lateral and, the airbag fails to properly restrain the occupant.

SUMMARY OF THE INVENTION

The object of the present invention is to provide an occupant protection system that, when a vehicle is impacted on a lateral, is capable of protecting an occupant seated away from the impacted lateral in a secure manner.

The object of the invention is attained by an occupant protection system mountable on a vehicle having a row of seats arranged along a left and right direction and operable when the vehicle is impacted on a lateral, the system including:

a catching body for catching a distant-side occupant seated on a distant seat that is located away from the lateral which has been impacted, the catching body being housed in a housing located between the distant seat and a near-by seat that is located close to the impacted lateral for deployment on a side of the distant seat close to the impacted lateral, the catching body including a fixed end fixed to the housing and a distal end acting as a free end swingable in a left and right direction; and a support body located on a side of the near-by seat close to the impacted lateral, the support body being configured to support the catching body when the catching body swings toward the impacted lateral upon receiving the distant-side occupant.

With the occupant protection system of the invention, when the vehicle is impacted on a lateral, the catching body deploys between the near-by seat and the distant seat, i.e. on the side of the distant-side occupant close to the impacted lateral, namely the impact side of the distant-side occupant. Since the distal end of the catching body is left free for swinging in a left and right direction whereas the other end is fixed to the housing, when catching the distant-side occupant that moves toward the impacted lateral, the catching body so tilts that the distal end is oriented toward the impacted lateral. Then the support body located on the impact side of the near-by seat supports an impact-side region of the catching body and prevents the catching body from tilting further and failing to catch the distant-side occupant. That is, although the catching body moves toward the impacted lateral together with the distant-side occupant, it is supported by the support body and thus being enabled to securely catch the distant-side occupant. As a consequence, the occupant protection system of the invention captures the distant-side occupant in a secure manner by the catching body that receives the distant-side occupant and the support body that supports the catching body.

Therefore, the occupant protection system of the invention properly protects the occupant seated distant from the lateral which has been impacted.

If the catching body is comprised of an airbag that is inflatable with inflation gas, it can restrain the distant-side occupant softly in a cushioning manner.

It is further desired that the support body is constituted of a support airbag that is housed in a housing and inflatable with inflation gas for deployment on the impact side of the near-by seat.

If thus configured, the support body or airbag supports the catching body in a cushioning manner and further helps protect the distant-side occupant softly via the catching body.

Moreover, if the catching body includes ahead restraining region that restrains the head of the distant-side occupant, the catching body itself is capable of protecting the head of the distant-side occupant.

The above occupant protection system is desirably configured such that the deployment direction of the support body from the housing intersects with that of the catching body from the housing as viewed from a lateral of the vehicle.

Such a configuration will help prevent the distal end of the catching body, which moves toward the impacted lateral after catching a distant-side occupant, from engaging a distal end of the support body while moving adversely to (i.e. moving from the distal end to the root end of) the deployment direction of the support body. If the configuration of the system is such that the deployment direction of the support body from the housing and that of the catching body from the housing is the same, when the distal end of the catching body moves toward the impacted lateral after catching a distant-side occupant, it comes to engage the distal end of the support body while making a reverse movement to (a movement from the distal end to the root end of) the deployment direction of the support body. In such an instance, the support body is likely to buckle from the distal end and cannot support the distal end of the catching body in a stable manner. However, if the deployment direction of the support body intersects with that of the catching body, the distal end of the catching body after catching a distant-side occupant is prevented from engaging the support body from a direction oriented from the distal end toward the housing of the support body in a buckling manner, such that the support body is prevented from deforming upon contacting the distal end of the catching body and failing to support the catching body, thus the support body supports the catching body properly.

Furthermore, if the housing of the catching body is located at a low position between the near-by seat and the distant seat such that the catching body is deployable upward from the housing, the catching body is fixed to the housing at the lower end as the fixed end while leaving the upper end as the free end swingable in a left and right direction. That is, the catching body is swingable about the lower end. Thus, when receiving a distant-side occupant moving in a tilting manner toward the impacted lateral, the catching body tilts as well along with the occupant such that the distal end is directed toward the impacted lateral, thus receiving a generally entire area of the impact side of the distant-side occupant.

DESCRIPTION OF PREFERRED EMBODIMENTS

Preferred embodiments of the present invention are now described below with reference to the accompanying drawings. However, the invention is not limited to the embodiments disclosed herein. All modifications within the appended claims and equivalents relative thereto are intended to be encompassed in the scope of the claims.

Unless otherwise specified, front/rear, up/down, and left/right directions in the embodiments described below are intended to refer to front/rear, up/down, and left/right directions of the vehicle.

The embodiments shown and described below are described for illustrative purposes as is mounted on a vehicle V which is impacted on the left lateral (on the side adjacent the front passenger's seat PS). Therefore, the left lateral of the vehicle will be called the impacted lateral. The front passenger's seat PS located on the left side of the vehicle will be called a near-by seat which is near the impacted lateral, the driver's seat DS located on the right side will be called a distant seat which is distant from the impacted lateral, whereas a driver DP seated in the driver's seat DS will be called a distant-side occupant. The occupant protection system M embodying the present invention is to protect the distant-side occupant.

Figure 1:
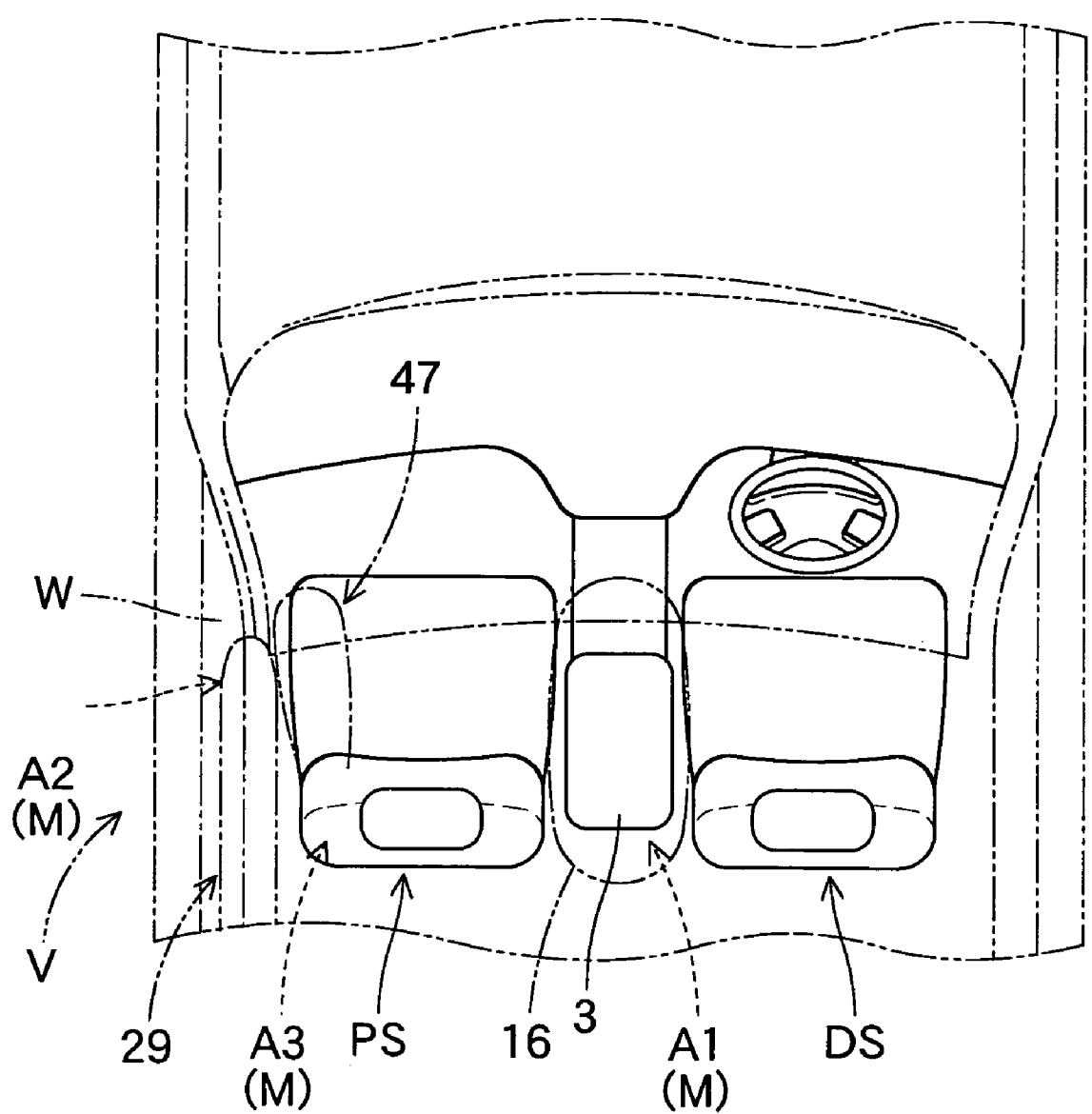
FIG. 1 is a schematic partial enlarged plan view of a vehicle equipped with an occupant protection system embodying the invention as viewed from above.
Figure 10:
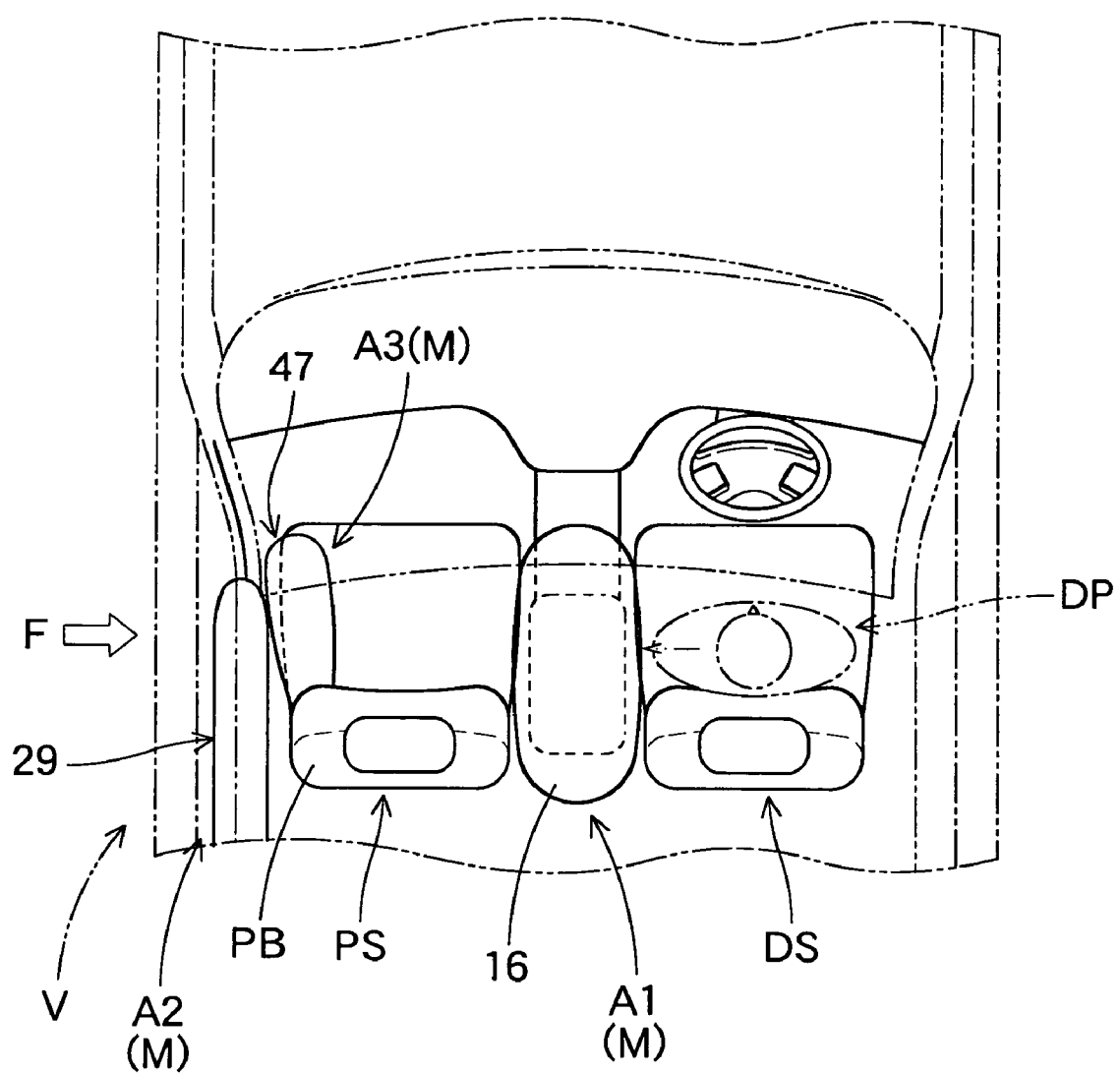
FIG. 10 is a schematic partial enlarged plan view of the vehicle at full deployment of the side airbag, the first support airbag and the second support airbag as viewed from above.
Figure 11:
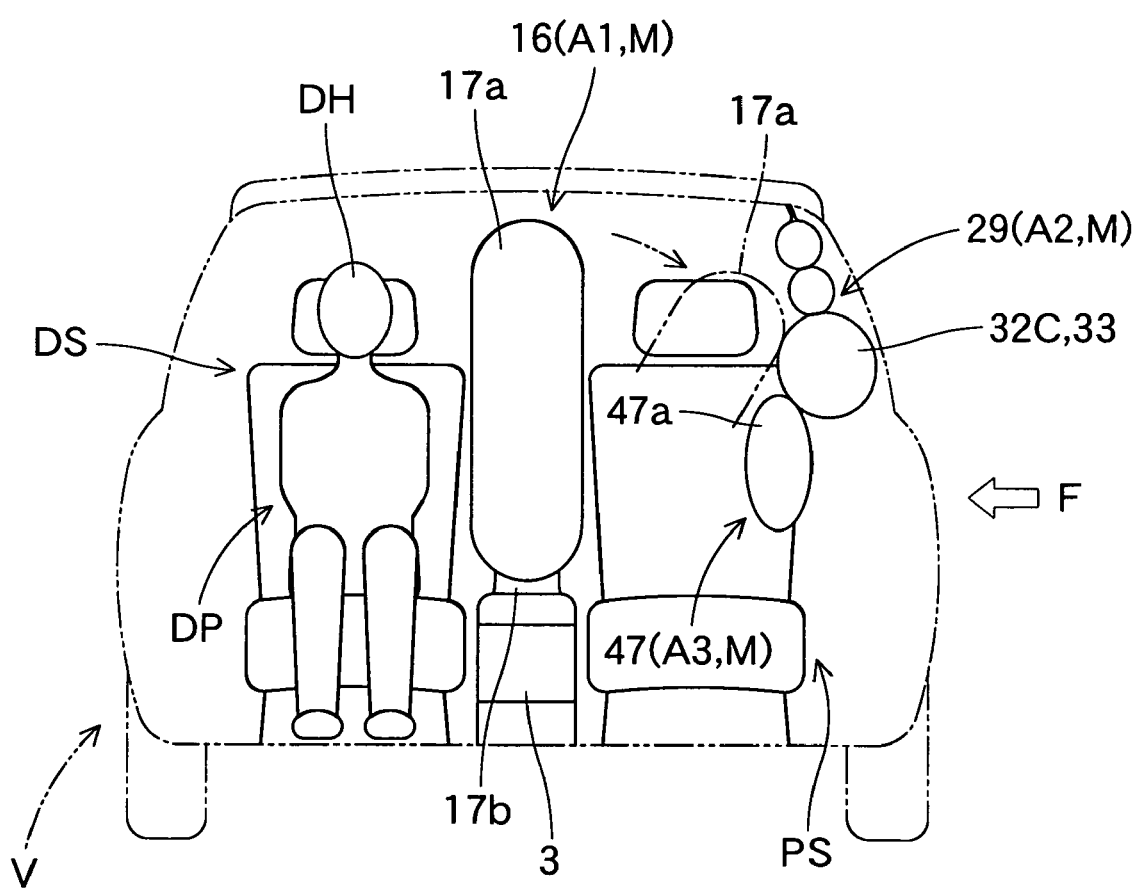
FIG. 11 is a schematic front view of the vehicle at full deployment of the side airbag, the first support airbag and the second support airbag as viewed from the front.

As shown in FIGS. 1, 10 and 11, the occupant protection system M includes a side airbag unit A1 located between the driver's seat DS and the front passenger's seat PS (i.e. located on the side of the driver's seat DS near the impacted lateral), a first support airbag unit A2 located on the outboard side (on the impact side) of the front passenger's seat PS, specifically on the upper periphery of the window W, and a second support airbag unit A3 located on a left region (on the impact side) of a backrest PB of the front passenger's seat PS.

Figure 2:
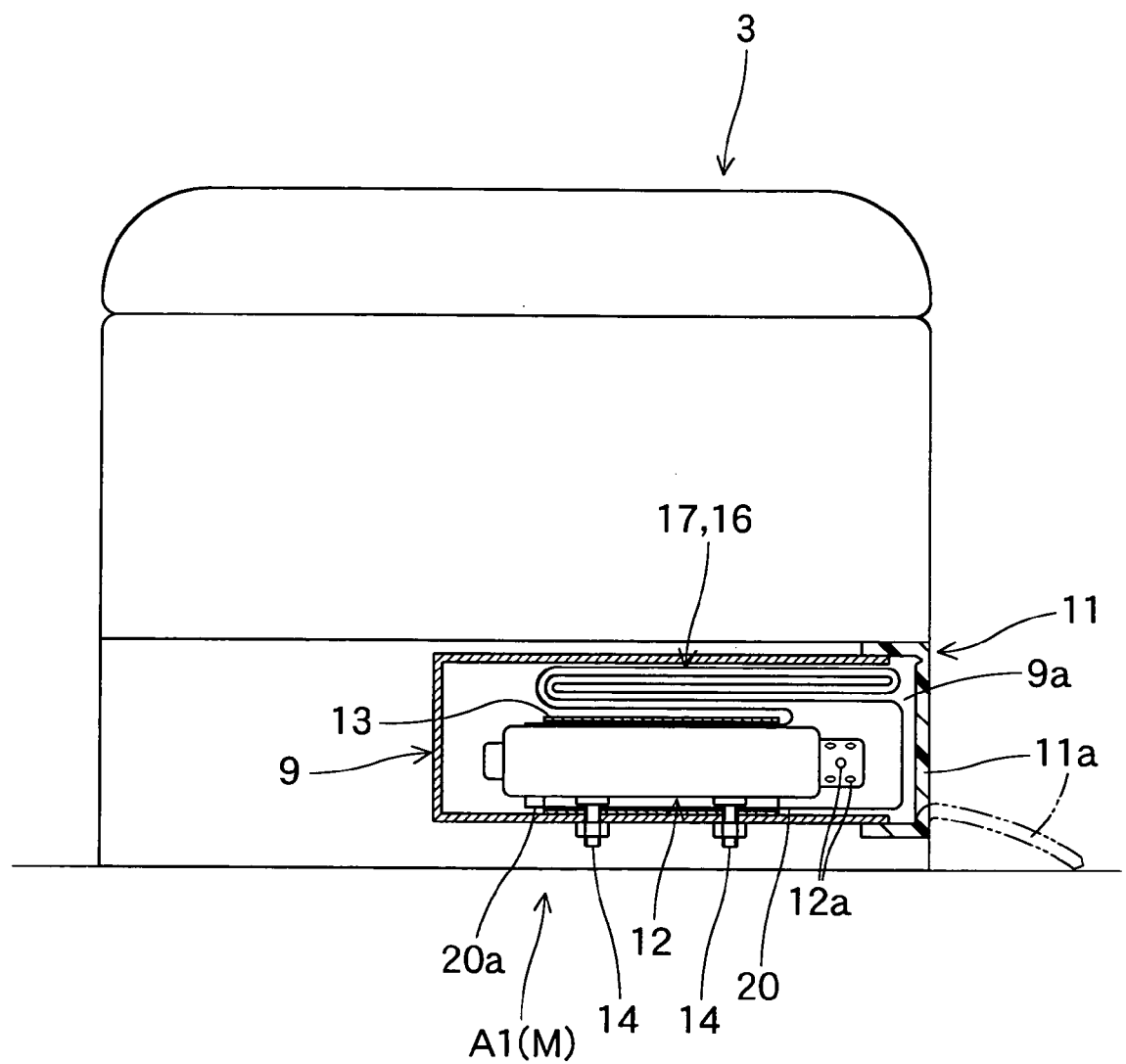
FIG. 2 is a schematic vertical section of a side airbag unit used in the occupant protection system of the invention.

As shown in FIG. 2, the side airbag unit A1 of this specific embodiment is located below a console box 3 located between the driver's seat DS and front passenger's seat PS. The airbag unit A1 includes a side airbag 16 acting as a catching body, an inflator 12 for supplying the airbag 16 with inflation gas, a case or housing 9 that houses the airbag 16 and the inflator 12, the case having an opening 9a, and an airbag cover 11 covering the opening 9a of the case 9.

The case 9 is located below the console box 3 located between the driver's seat DS and front passenger's seat PS. The case 9 is made of sheet metal into a generally box shape and has the opening 9a at the rear side. In this embodiment, the case 9 is connected to a vehicle body structure 1 by being coupled to an element for reinforcing a floor tunnel with unillustrated brackets.

The airbag cover 11 is made of synthetic resin and is arranged to cover the opening 9a of the case 9. The airbag cover 11 includes a door 11a that covers the opening 9a for opening when pushed by the airbag 16 at inflation.

The inflator 12 of this specific embodiment extends along an anteroposterior direction in a generally columnar shape as shown in FIG. 2, and is provided at the rear end region with discharge ports 12a for discharging inflation gas. The rear end region having the discharge ports 12a is inserted into a later-described inlet port 20 of the airbag 16. The inflator 12 is coupled with the airbag 16 with a mounting bracket 13 which is also used to mount the inflator 12 on the case 9. The mounting bracket 13 is mounted around the inlet port 20 of the airbag 16 that is mounted around the inflator 12, and fixed to the underside of the case 9 by bolts 14, thus mounting the airbag 16 and inflator 12 on the case 9. The inflator 12 is electrically connected to a circuit for activating airbags with an unillustrated lead wire.

Figure 3:
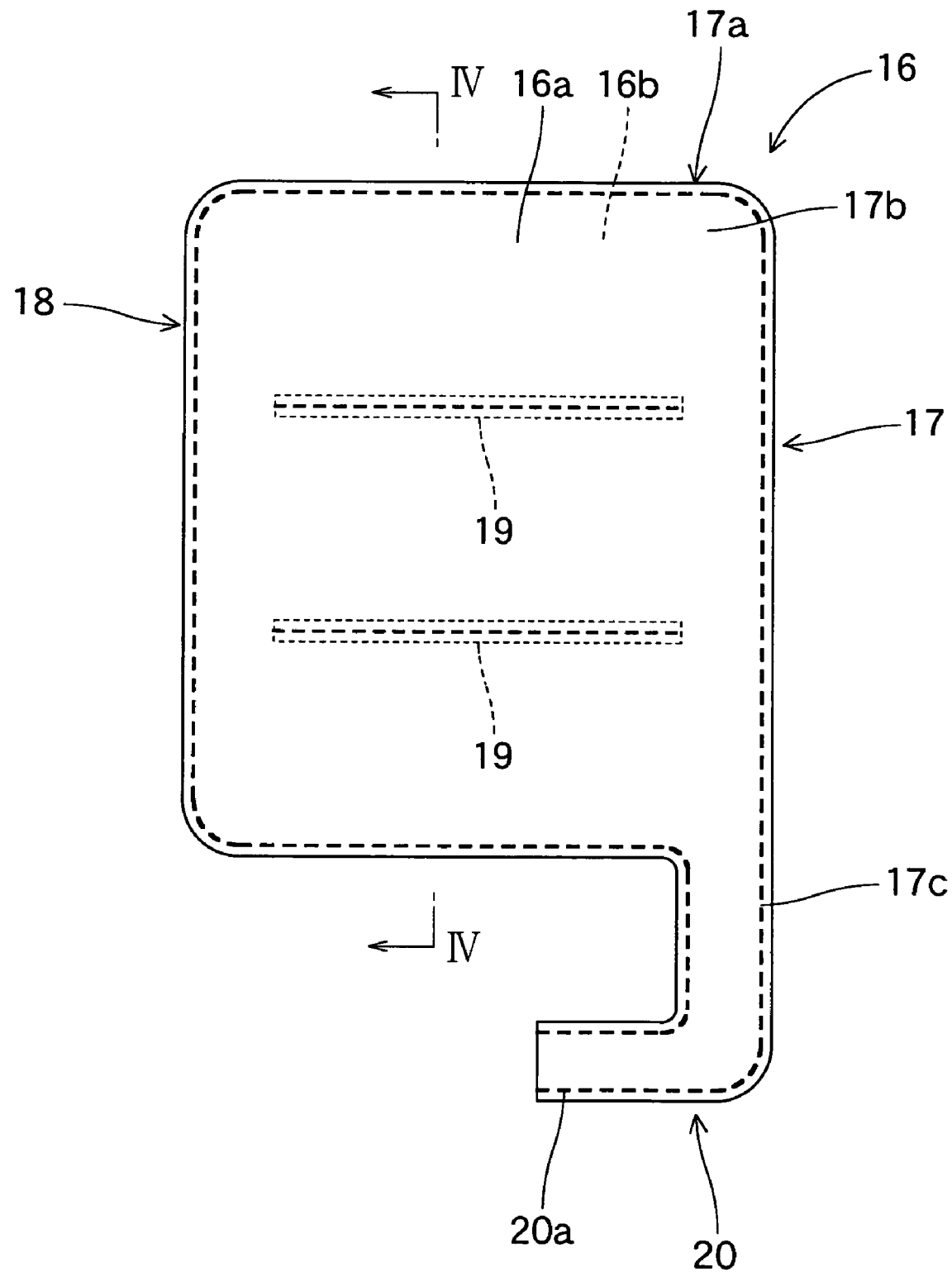
FIG. 3 is a side view of a side airbag of the side airbag unit of FIG. 2 as inflated by itself.
Figure 4:
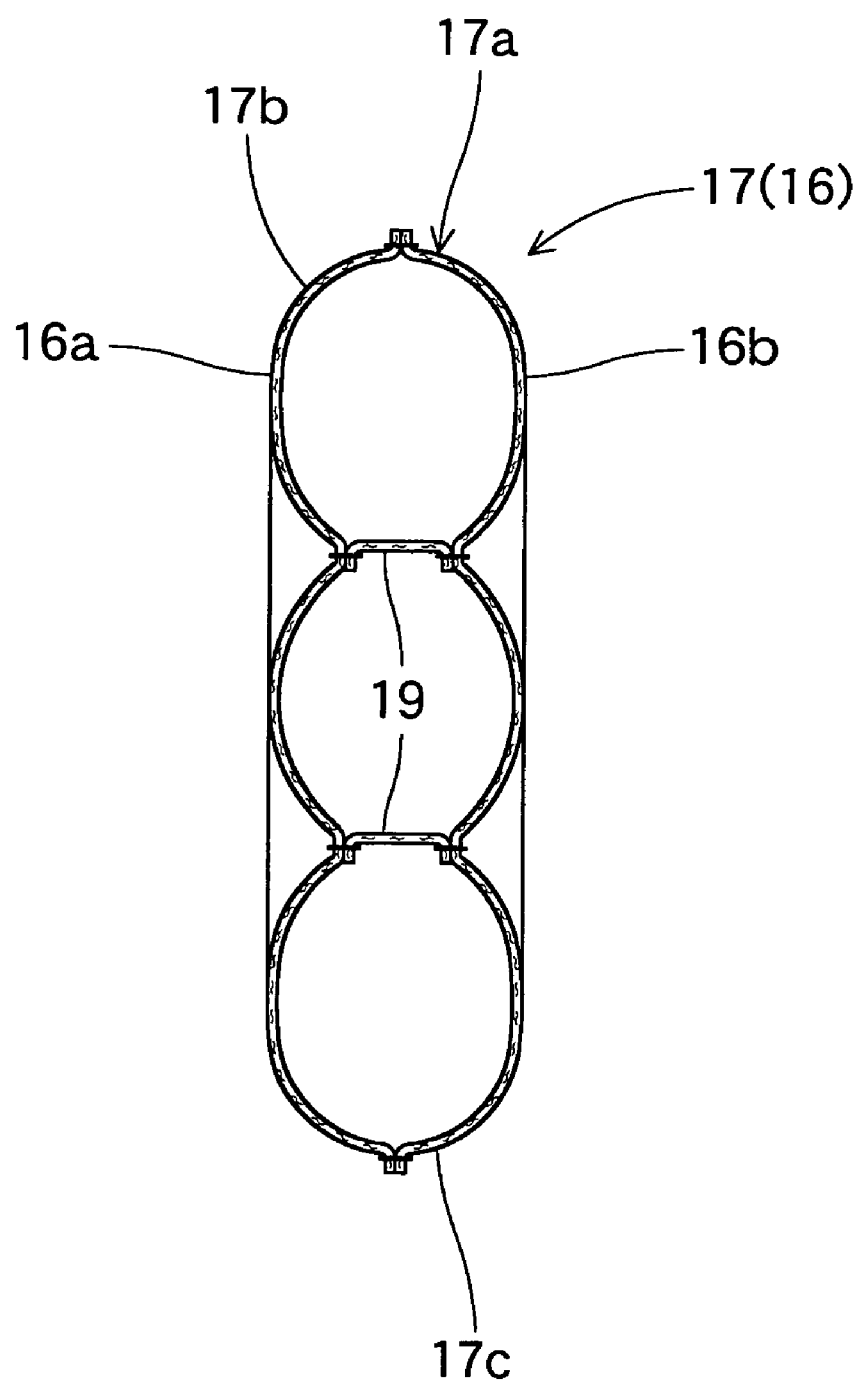
FIG. 4 is a sectional view taken along line IV-IV of FIG. 3.

The side airbag 16 acting as the catching body is formed of flexible woven fabric of polyester, polyamide yarns or the like into a bag shape. In this embodiment, as shown in FIGS. 3 and 4, the airbag 16 includes a main body 17 deployable to cover the impact side (i.e., the left side) of a driver DP and a gas inlet portion 20 that extends downward from the rear lower end of the main body 17 in such a manner as to bend forward at the leading end 20a. The airbag 16 is a planar bag that is made by sewing peripheral edges of two generally identical panels together; a near-by panel 16a deployable facing the impacted lateral (i.e. facing the front passenger's seat PS) and a distant-side panel 16b deployable on the distant side (i.e. facing the driver's seat DS). The gas inlet port 20 is opening at the leading end (front end) 20a and is mounted around the inflator 12, and is secured to the case 9 together with the inflator 12 at the leading end region 20a by the mounting bracket 13 as described above.

Figure 5:
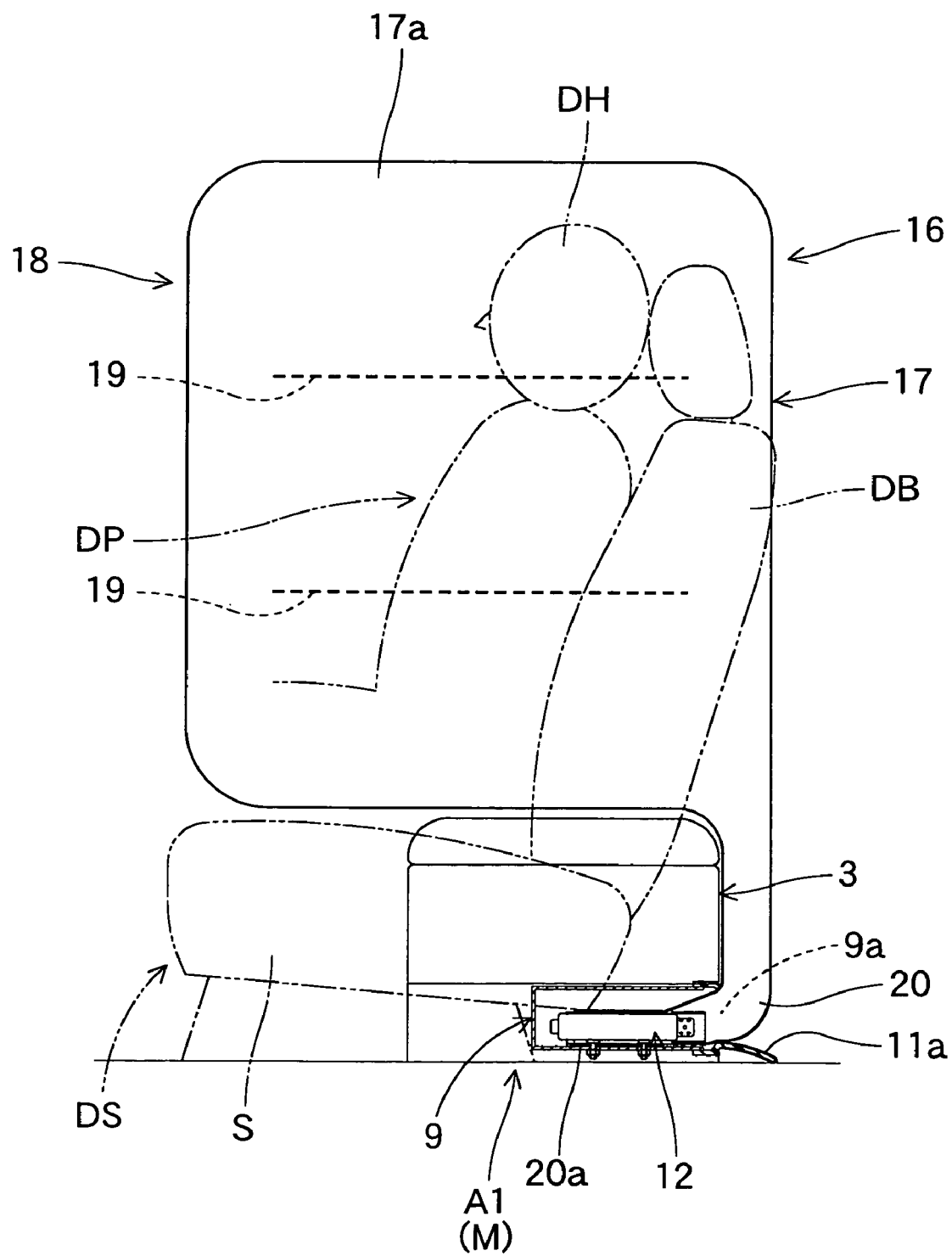
FIG. 5 is a side view of the side airbag unit of FIG. 2 as viewed from the impacted lateral showing the side airbag at full deployment.

Referring to FIGS. 3, 4 and 5, the main body 17 is designed inflatable into a generally rectangular plate shape whose length direction extends generally vertically such that it covers the impact side (left side) of a driver DP over a generally entire area. The main body 17 may internally include a tether 19 that connects the near-by panel 16a and distant-side panel 16b together for regulating a clearance between the panels 16a and 16b and for keeping the airbag 16 in a plate shape at full inflation. In the illustrated embodiment, two of the tethers 19 are arranged horizontally (along an anteroposterior direction) one above the other.

The main body 17 is configured to have such vertical and anteroposterior dimensions at full inflation as to catch a driver DP. More specifically, the vertical dimension is sized to cover an area from the top plane of the console box 3 to the head DH of the driver DP whereas the anteroposterior dimension is sized to cover a generally entire anteroposterior area of the left side (the impact side) of the driver's seat DS above the seat S. The main body 17 of this specific embodiment is so designed that its upper end or top end 17a is deployable at a higher level than the head rest HR of the driver's seat DS. In other words, the main body 17 is deployable up to an area above the head DH of the driver DP, so that the upper end 17a and its vicinity of the main body 17 acts as a head restraining region 18 that covers the left side of the head DH of the driver DP and restrains the head DH at airbag deployment. Further, the main body 17 of this embodiment is so configured, when the main body 17 receives the driver DP and so tilts that the upper end 17a is oriented toward the left, as to engage and be supported by a later-described support region 33 of the first support airbag 29 at the left surface 17b of the upper end 17a (namely the impact-side region).

In this embodiment, the side airbag 16 is connected to the inflator 12 and secured to the case 9 utilizing the gas inlet port 20 that extends downward from the rear lower end of the main body 17. That is, in the airbag 16, the gas inlet portion 20 located at the lower end region 17c at full airbag inflation acts as a fixed end that is fixed to the case 9 whereas the upper end or distal end region 17a of the main body 17 acts as a free end that is swingable in a left and right direction. In operation, the side airbag 16 fed with inflation gas emerges from the opening 9a of the case 9 located below the console box 3 arranged between the driver's seat DS and front passenger's set PS, and deploys once rearward and then upward. Although the side airbag 16 of this embodiment is so designed as not to engage the ceiling R of the vehicle at the upper end 17a at full deployment as shown in FIG. 11, the shape of the upper end (free end) of the airbag of the invention should not be limited thereby. The side airbag may alternatively be designed into such a shape as to engage the ceiling because, even in the event that the upper end (free end or distal end) engages the ceiling, the upper end becomes swingable again if it is freed from the engagement with the ceiling by being pushed by a distant-side occupant that the airbag has received.

Figure 6:
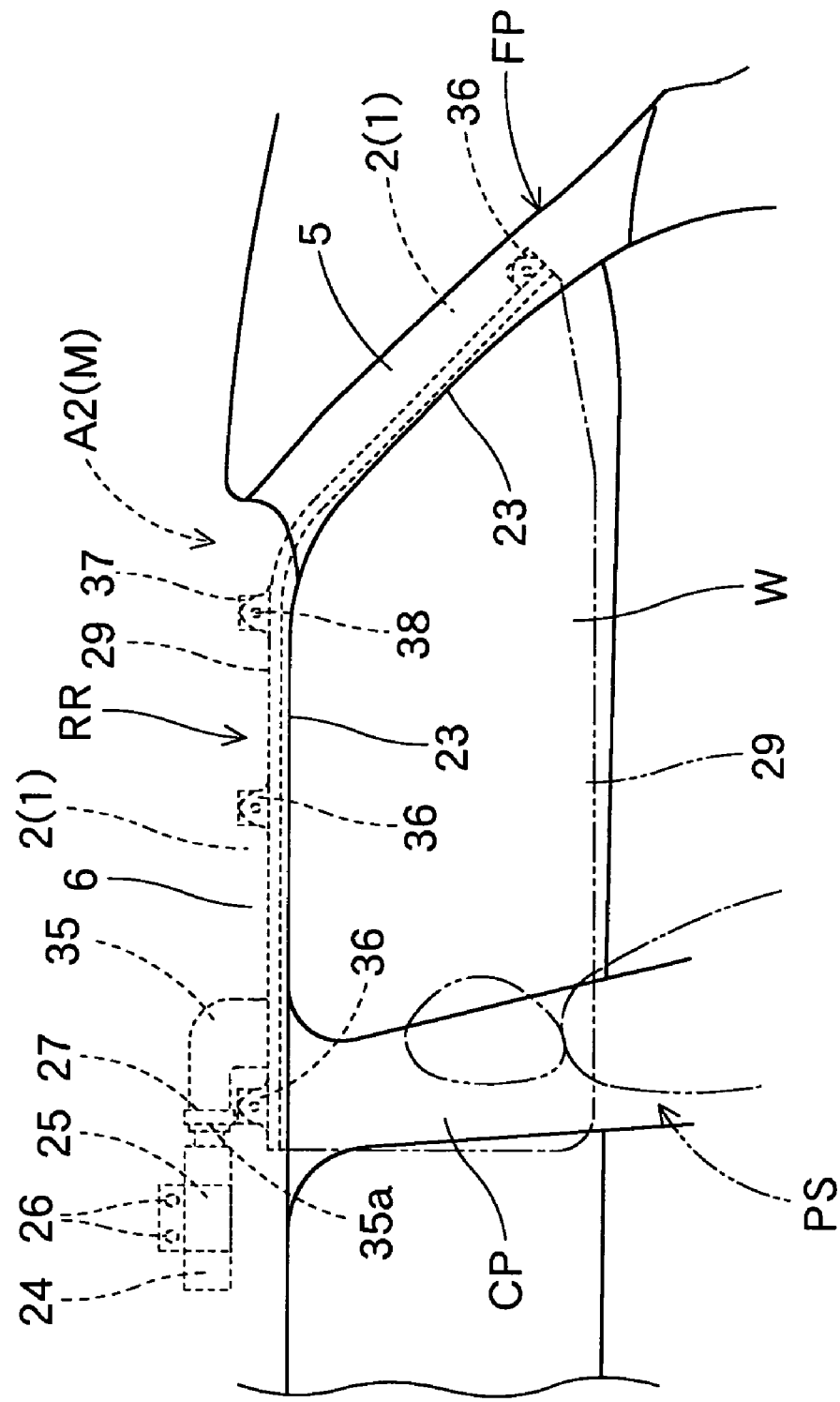
FIG. 6 is a schematic side view of a first support airbag unit used in the occupant protection system of the invention as viewed from an interior of vehicle.
Figure 7:
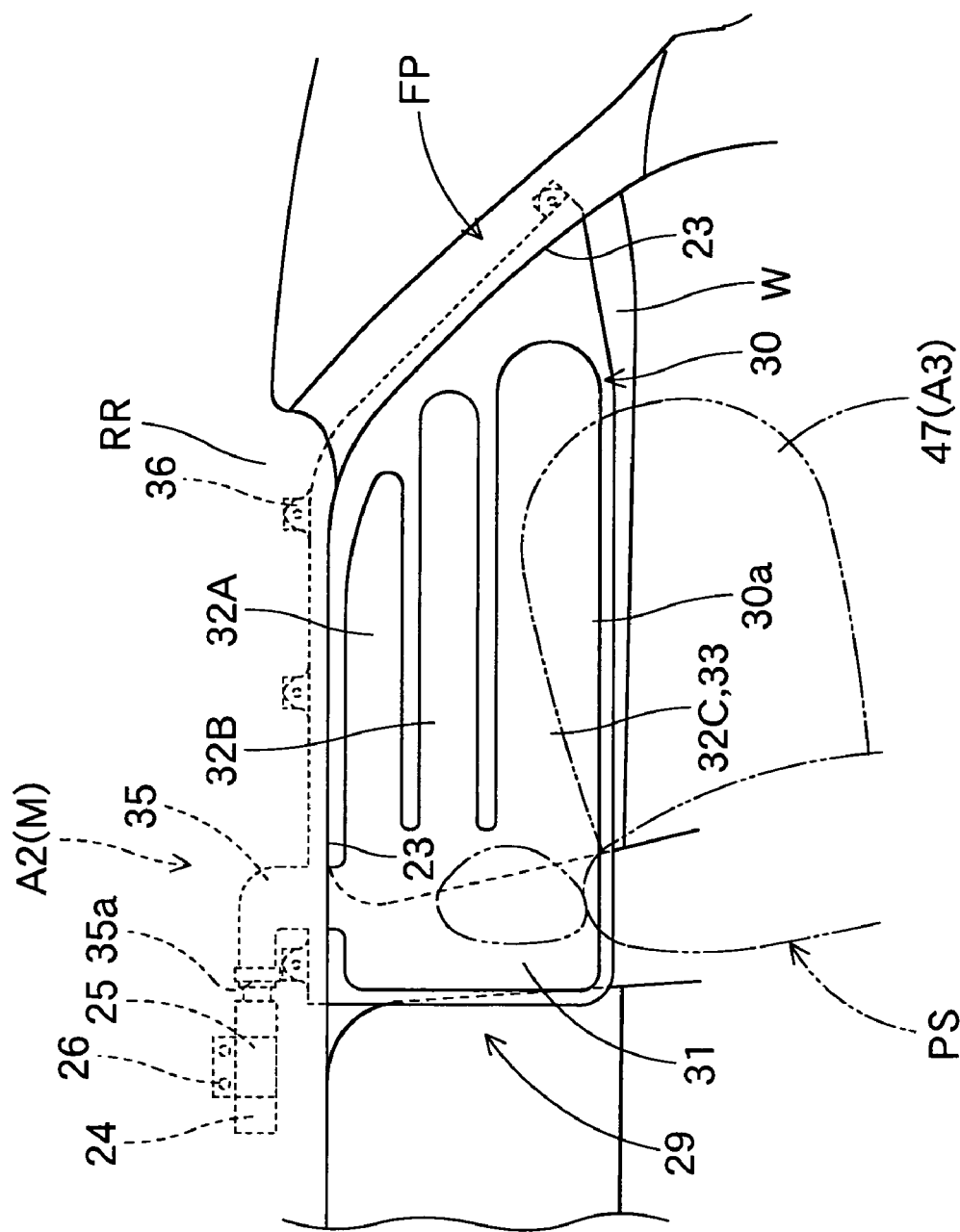
FIG. 7 is a side view of the first support airbag unit of FIG. 6 showing a first support airbag at full deployment.

Referring to FIGS. 6 and 7, the first support airbag unit A2 is mounted on the upper periphery of the window (side window) W located on the impact side of the front passenger's seat PS. That is, as in the illustrated embodiment, the airbag unit A2 is mounted on the front pillar FP and roof side rail RR above the side window W located adjacent the front passenger's seat PS. The airbag unit A2 includes a first support airbag 29 folded up and housed on the front pillar FP and roof side rail RR, an inflator 24 for supply of inflation gas to the airbag 29, and an airbag cover 23 covering the inboard side of the airbag 29. The airbag unit A2 involves application of the technology of a head-protecting airbag apparatus for protecting a head of an occupant seated in a front passenger's seat, and is so modified that the airbag 29 support the upper end region 17a of the side airbag 16 at full inflation.

As shown in FIGS. 6 and 7, the airbag cover 23 is comprised of lower peripheries of a pillar garnish 5 and a roof head liner 6 mounted respectively on the front pillar FP and the roof side rail RR. The airbag cover 23 covers the inboard side of the airbag 29 housed in a folded-up state and is configured openable toward the interior of vehicle so as to allow airbag deployment.

The inflator 24 is generally columnar in shape and includes at the leading end region unillustrated discharge ports for discharging inflation gas. The leading end region of the inflator 24 including a vicinity of the discharge ports is inserted into a later-described gas inlet port 35 of the first support airbag 29 and coupled with the airbag 29 by a clamp 27 that is mounted around a leading end region 35a of the gas inlet port 35. The inflator 24 of the illustrated embodiment is mounted on a location on an inner panel 2 (vehicle body structure 1) above the center pillar CP located at the rear of the window W with a mounting bracket 25 that holds the inflator 24 and bolts 26 that secure the bracket 25 to the inner panel 2. The inflator 24 is electrically connected to the circuit for activating the airbags with an unillustrated lead wire.

The first support airbag 29 is to constitute a support body for supporting the side airbag 16 that moves over in such a manner as to tilt the upper end region 17a toward the left after receiving a driver DP at activation of the system. As shown in FIG. 6, the airbag 29 is housed along the upper periphery of the window W in such a manner as to extend over lower peripheries of the front pillar FP and the roof side rail RR, in a folded-up state. The airbag 29 is so designed as to unfold and deploy downward to cover the inboard side of the window W when fed with inflation gas. The airbag 29 of this embodiment has a hollow-weave or one-piece woven structure of polyester, polyamide yarns or the like, and is inflatable into a generally trapezoidal plate shape sized to cover the window W. More specifically, the airbag 29 includes a shielding portion 30 deployable to cover the window W and a gas inlet port region 35 that introduces inflation gas into the shielding portion 30. In shape, the inlet port region 35 extends upward from the vicinity of the rear end of the upper periphery of the shielding portion 30 and then is bent toward the rear at the leading end. The inlet port 35 is coupled with the inflator 24 at the leading end region 35a by the clamp 27 that clamps the leading end region 35a against the inflator 24.

As shown in FIG. 7, the shielding portion 30 is inflatable into a generally plate shape. Including partitioning portions (assigned no reference numerals) that partition the interior space, the shielding portion 30 includes a vertical inflatable cell 31 extending vertically at the rearmost region and three horizontal inflatable cells 32A, 32B and 32C arranged one above another in gas communication with the vertical cell 31 at the rear ends. Each of the horizontal cells 32A, 32B and 32C is arranged along an anteroposterior direction, and the horizontal cell 32C located proximate the lower end 30a is greater in vertical dimension than remaining horizontal cells 32A and 32B so as to inflate thicker than the cells 32A and 32B as shown in FIG. 11. In the first support airbag 29 of the illustrated embodiment, this horizontal vertical cell 32C that is arranged along a horizontal direction proximate the lower end 30a of the shielding portion 30 at full inflation of the airbag 29 constitutes the support region 33 that supports the left surface 17b of the upper end region 17a of the side airbag 16, namely, the impact-side region. In this specific embodiment, the first support airbag 29 at full inflation is prevented from moving out of the vehicle by the support of the window W and thus enabled to support the impact-side region (i.e. the left surface 17b of the upper end region 17a) of the side airbag 16. It will also be appreciated that the airbag 29 is prevented from moving outward by a tension force that occurs along the lower edge in an anteroposterior direction at full inflation, upon contacting the side airbag.

The first support airbag 29 includes along the upper periphery of the shielding portion 30 a plurality of mounting portions 36 as shown in FIGS. 6 and 7, and is mounted on the vehicle body structure 1 by these mounting portions 36, which are secured to the inner panel 2 at the upper periphery of the window W ranging from the front pillar FP to the roof side rail RR, with mounting brackets 37 and bolts 38.

Figure 8:
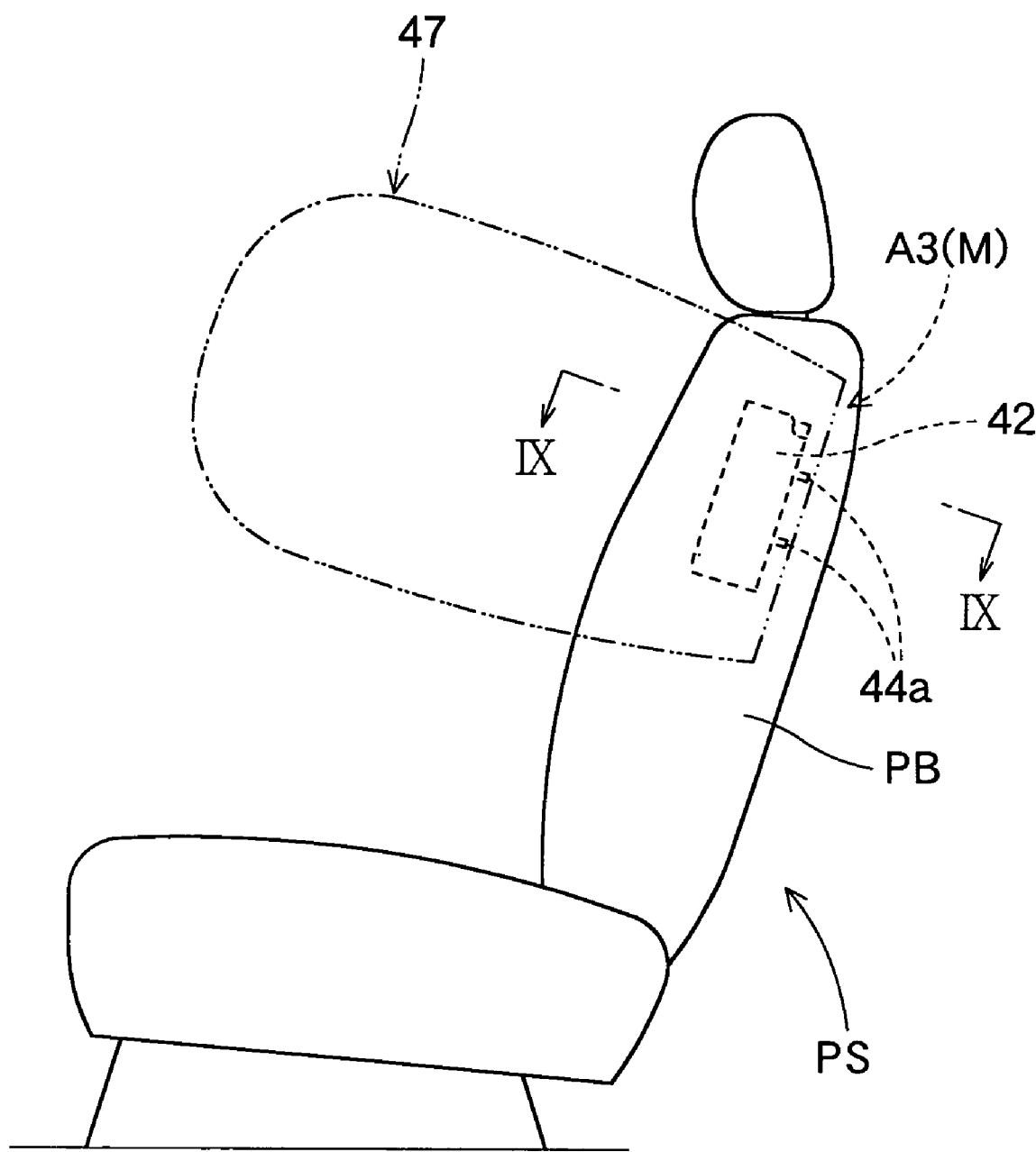
FIG. 8 is a schematic side view of a second support airbag unit used in the occupant protection system of the invention as viewed from the impacted lateral.
Figure 9:
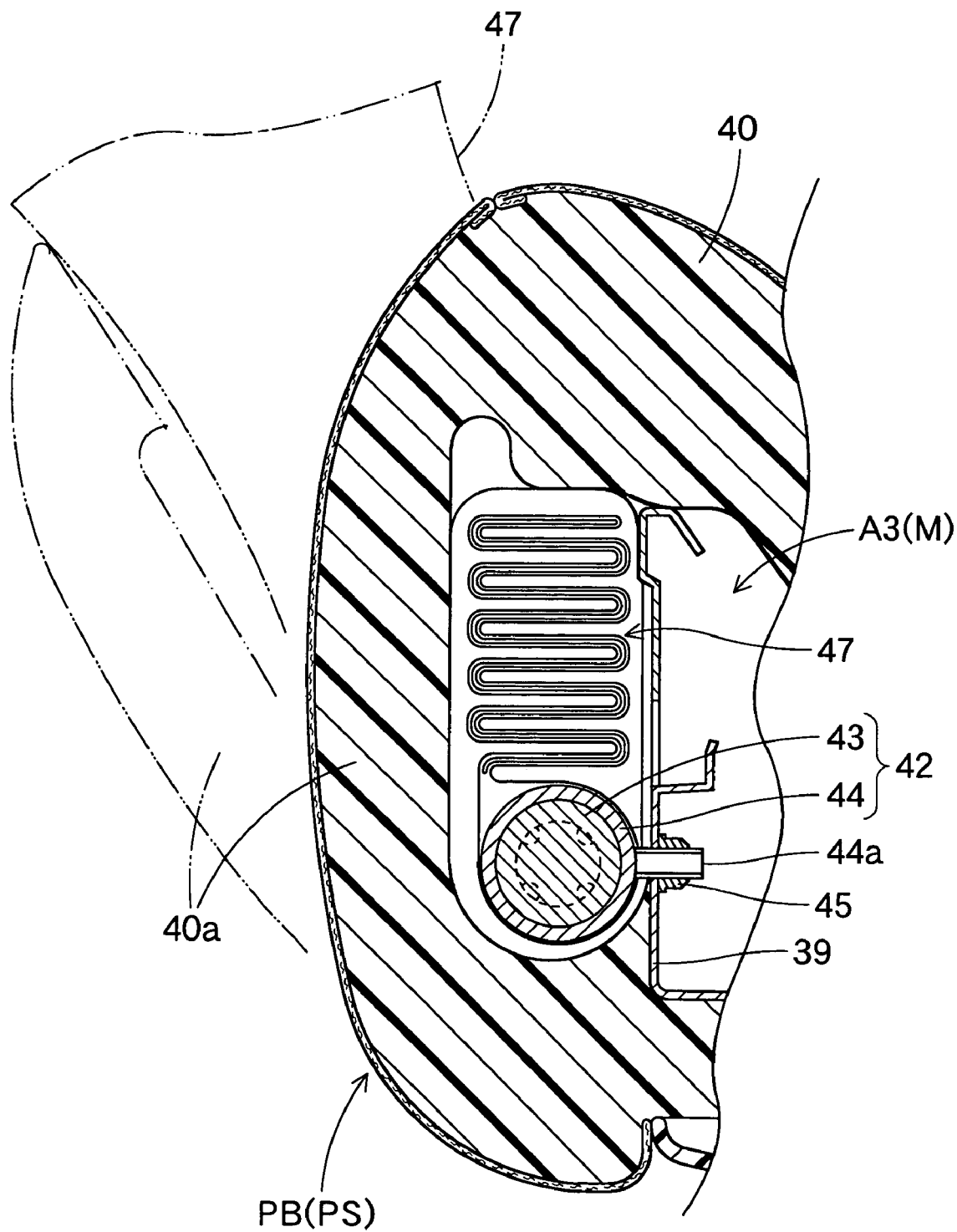
FIG. 9 is a schematic horizontal section of the second support airbag unit taken along line IX-IX of FIG. 8.

Referring to FIGS. 8 and 9, the second support airbag unit A3 is located on a left-side region (on the impact-side region) of the backrest PB of the front passenger's seat PS, and includes a second support airbag 47 in a folded-up configuration and an inflator 42 supplying inflation gas to the airbag 47. The airbag unit A3 involves application of the technology of a side-impact airbag apparatus that is mounted on a backrest of a front passenger's seat for protecting a thorax region of an occupant seated in the front passenger's seat, and is so modified that the airbag 47 support the upper end region 17a of the side airbag 16 at full inflation.

The second support airbag unit A3 is mounted inside the backrest PB of the front passenger's seat PS, covered overall by a cushion 40 of the backrest PB and secured to a seat frame 39 extending generally vertically inside the backrest PB. The region of the airbag unit A3 from the front side to the outboard side (the impact side) is covered by a left peripheral region 40a of the cushion 40 as shown in FIG. 9. The peripheral region 40a is designed separable from the remainder of the cushion 40 when pushed by the airbag 47 upon airbag deployment, and thus allowing the airbag to deploy forward.

Referring to FIGS. 8 and 9, the inflator 42 includes a generally columnar body 43 extending generally vertically and a mounting bracket 44 which is generally annular in shape and mounted around the body 43. The body 43 is provided with unillustrated discharge ports for supplying the airbag 47 with inflation gas. The mounting bracket 44 includes at two positions in a vertical direction bolts 44a projecting rearward. The inflator 42 of this specific embodiment is housed inside the airbag 47 with the bolts 44a of the mounting bracket 44 projected out of the airbag 47, and secured to the seat frame 39 together with the airbag 47 by nuts 45 fastening the bolts 44a to the seat frame 39 as shown in FIG. 9. The inflator 42 is electrically connected to the circuit for activating the airbags with an unillustrated lead wire.

Figure 13A:
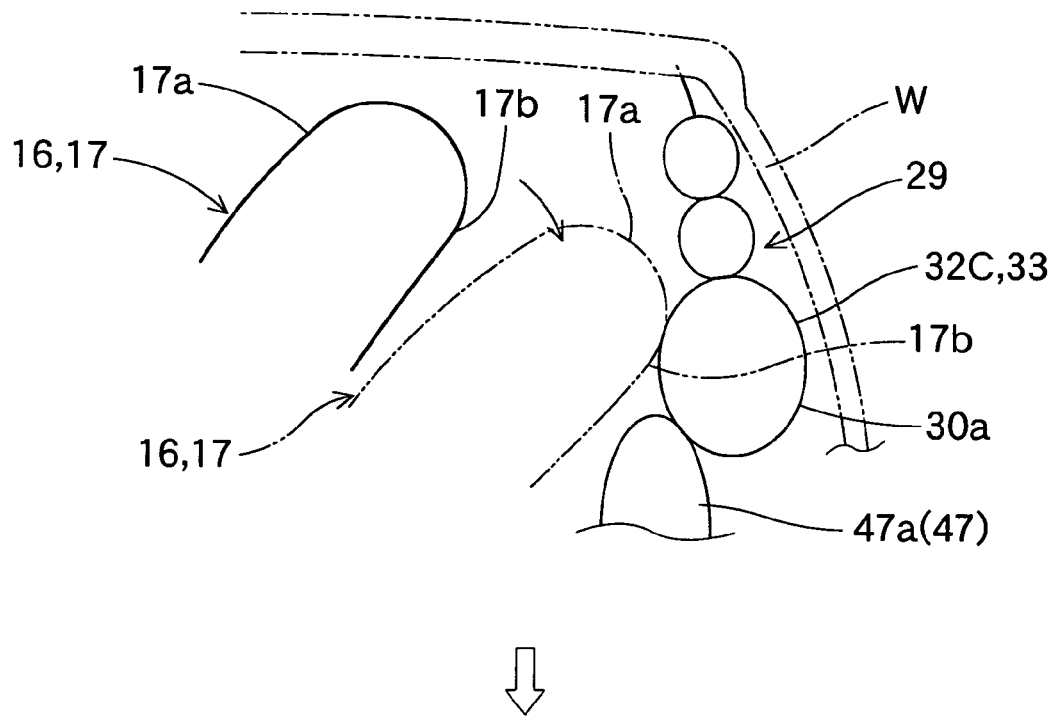
FIGS. 13A and 13B are schematic enlarged views of the vehicle as viewed from the front showing the way an upper end region of the side airbag is supported by the first support airbag and the second support airbag.
Figure 13B:
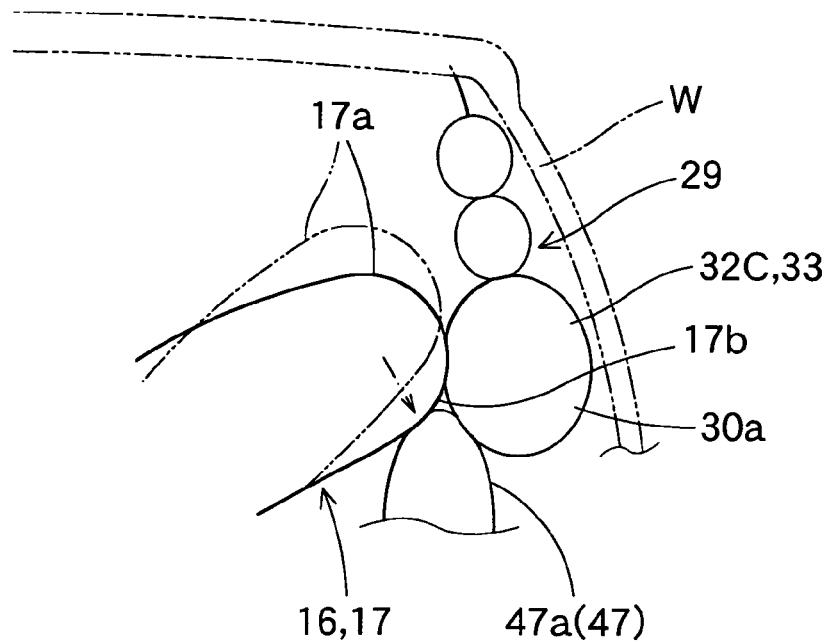

The second support airbag 47 is to constitute a support body for supporting the side airbag 16 that moves over in such a manner as to tilt the upper end region 17a toward the left after receiving a driver DP at activation of the system. Similarly to the side airbag 16 described above, the airbag 47 is made of flexible woven fabric of polyester, polyamide yarns or the like into a bag shape. The airbag 47 of this embodiment is designed deployable forward from the left-side region (the impact-side region) of the backrest PB of the front passenger's seat PS in such a manner as to extend forward from the backrest PB along a generally anteroposterior direction. The airbag 47 is inflatable into a generally rectangular plate shape whose length direction extends along an anteroposterior direction as indicated by double-dashed lines in FIG. 8, and is so sized that the width in an anteroposterior direction generally conforms to that of the side airbag 16 described above. As shown in FIGS. 10 and 11, the airbag 47 is deployable on the distant side (on the inboard side) of the first support airbag 29 as fully inflated such that the upper end region 47a of the airbag 47 is positioned proximate and on the inboard side of the support region 33 located proximate the lower end region 30a of the first support airbag 29. Even more specifically, as shown in FIGS. 13A and 13B, the airbag 47 is designed so deployable that the upper end region 47a overlaps with the support region 33 of the first support airbag 29 as fully inflated in an inboard and outboard direction (in a left and right direction). This upper end region 47a of the second support airbag 47 constitutes the support region that supports the left surface 17b of the upper end region 17a of the side airbag 16, i.e., the impact-side region.

In operation, when the vehicle V is impacted on the left side by an object F (FIGS. 10, 11 and 12), the inflators 12, 24, 42 of the side airbag unit A1, the first support airbag unit A2 and the second support airbag unit A3 are respectively activated in response to an activating signal fed from the activating circuit. Then the side airbag 16 inflates, pushes and opens the door 11a of the airbag cover 11, emerges from the opening 9a of the case 9 and deploys once rearward and then upward between the front passenger's seat PS and the driver's seat DS so it covers the impact side or left side of the driver DP (FIGS. 5, 10 and 11). The first support airbag 29 inflates, pushes and opens the airbag cover 23 and deploys downward to cover the inboard side of the window W (FIGS. 7, 10 and 11). The second support airbag 47 inflates, projects forward from the backrest PB of the front passenger's seat PS, and deploys on the inboard side of the first support airbag 29 (FIGS. 10 and 11).

Figure 12:
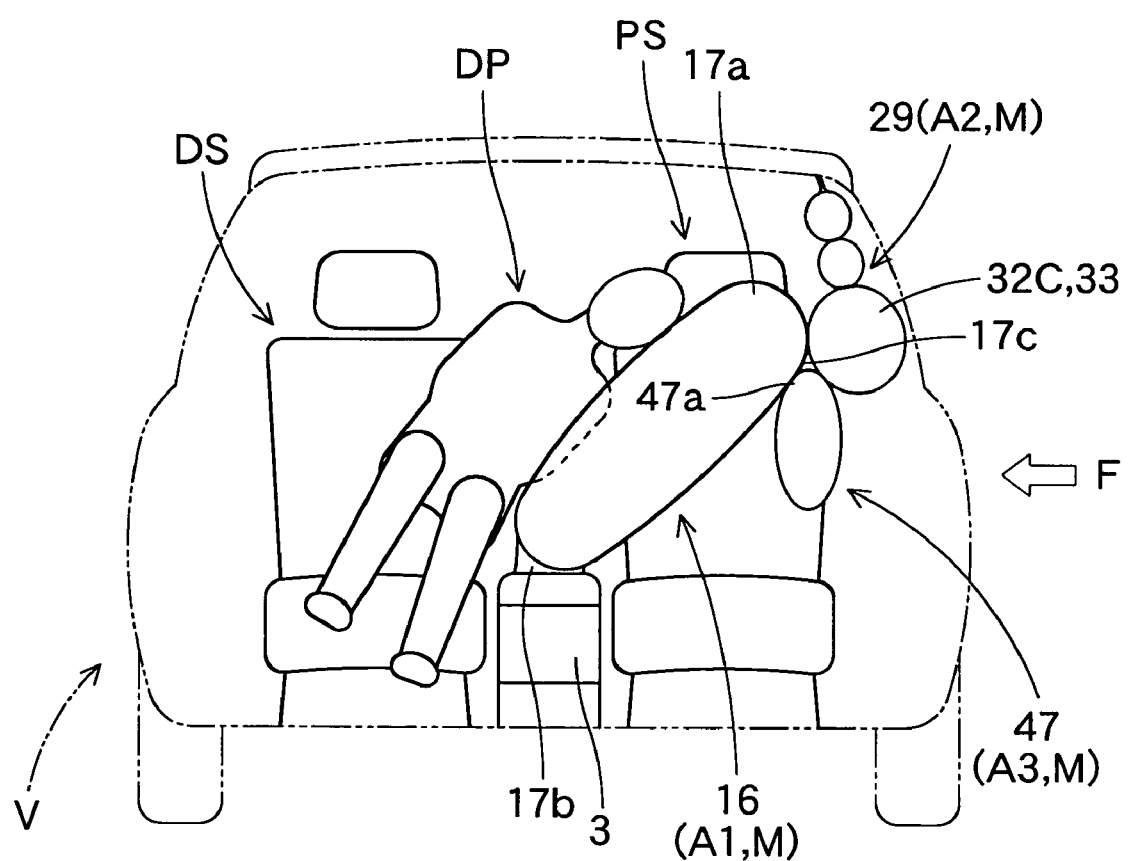
FIG. 12 is a schematic front view of the vehicle as viewed from the front showing the way the side airbag having caught a driver is supported by the first support airbag and the second support airbag.

With the occupant protection system M of the foregoing embodiment, when the vehicle is impacted on a lateral (on the left side), the side airbag 16 acting as the catching body deploys between the front passenger's seat PS (near-by seat) and the driver's seat (distant seat DS) so it covers the impact-side (left side) of the driver DP (distant-side occupant). The lower end 17c of the side airbag 16 is fixed to the case 9 as the fixed end whereas the upper end or distal end 17a is left free for swinging in a left and right direction. Thus, when catching a driver DP that moves sideways toward the left, the side airbag 16 so tilts that the distal end 17a is oriented toward the impacted lateral (toward the left) as shown in FIG. 12. Then the support body, i.e., the first and second support airbags 29 and 47, in the foregoing embodiment, located on the side of the front passenger's seat PS close to the impacted lateral (i.e., on the left side of the front passenger's seat PS) support the impact-side region (the left surface 17b of the upper end 17a) of the side airbag 16 and prevent the side airbag 16 from tilting further and failing to catch the driver DP. More specifically, since the first support airbag 29 is supported by the window W at the outboard side and the second support airbag 47 is supported by the vehicle body structure 1 such as a door trim at the outboard side, the support airbags 29 and 47 support the upper end region 17a of the side airbag 16. That is, although the side airbag 16 once moves toward the left together with the driver DP as shown in FIG. 12, it is supported at the left surface 17a of the distal end 17a by the first and support airbags 29 and 47, and thus being enabled to securely catch the driver DP. As a consequence, the occupant protection system M of the foregoing embodiment captures the driver DP in a secure manner by the side airbag 16 that receives the driver DP and the first and second support airbags 29 and 47 that support the side airbag 16.

Therefore, the occupant protection system M embodying the invention properly protects the driver DP seated on the seat distant from the lateral which has been impacted.

Although the impact-side region of the side airbag 16 that is supported by the support airbags 29 and 47 is constituted of the left surface 17b of the distal end 17a of the side airbag 16 in the foregoing embodiment, the impact-side region should not be limited thereto. By way of example, an end region of the side airbag that intersects with the distal end may constitute the impact-side region that is supported by the support airbag.

Since the catching body of the occupant protection system M is comprised of the side airbag 16 that is inflatable with inflation gas, it can restrain the driver DP softly, in a cushioning manner.

Figure 14:
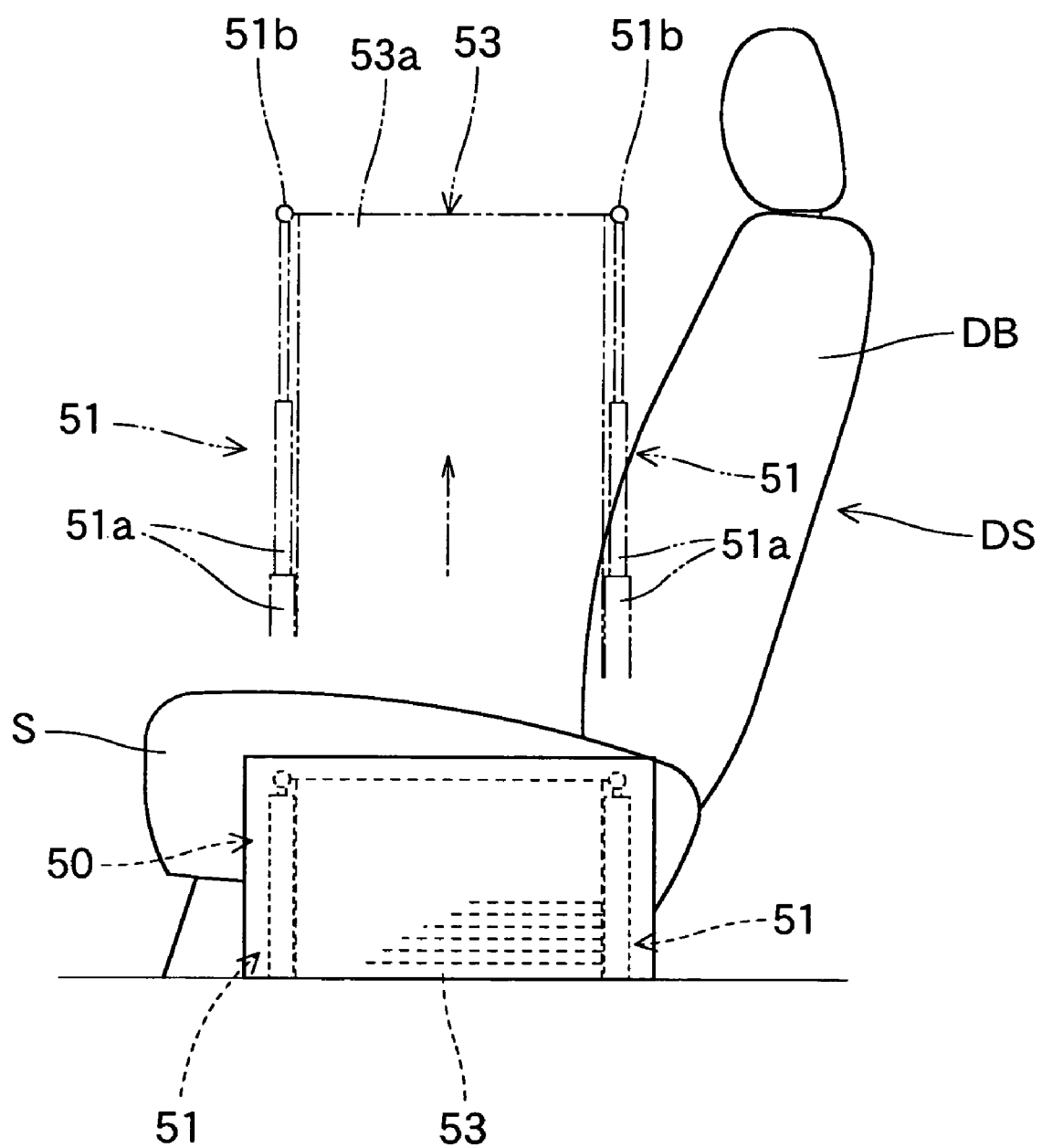
FIG. 14 is a side view of a modification of the catching body as viewed from the impacted lateral.
Figure 15:
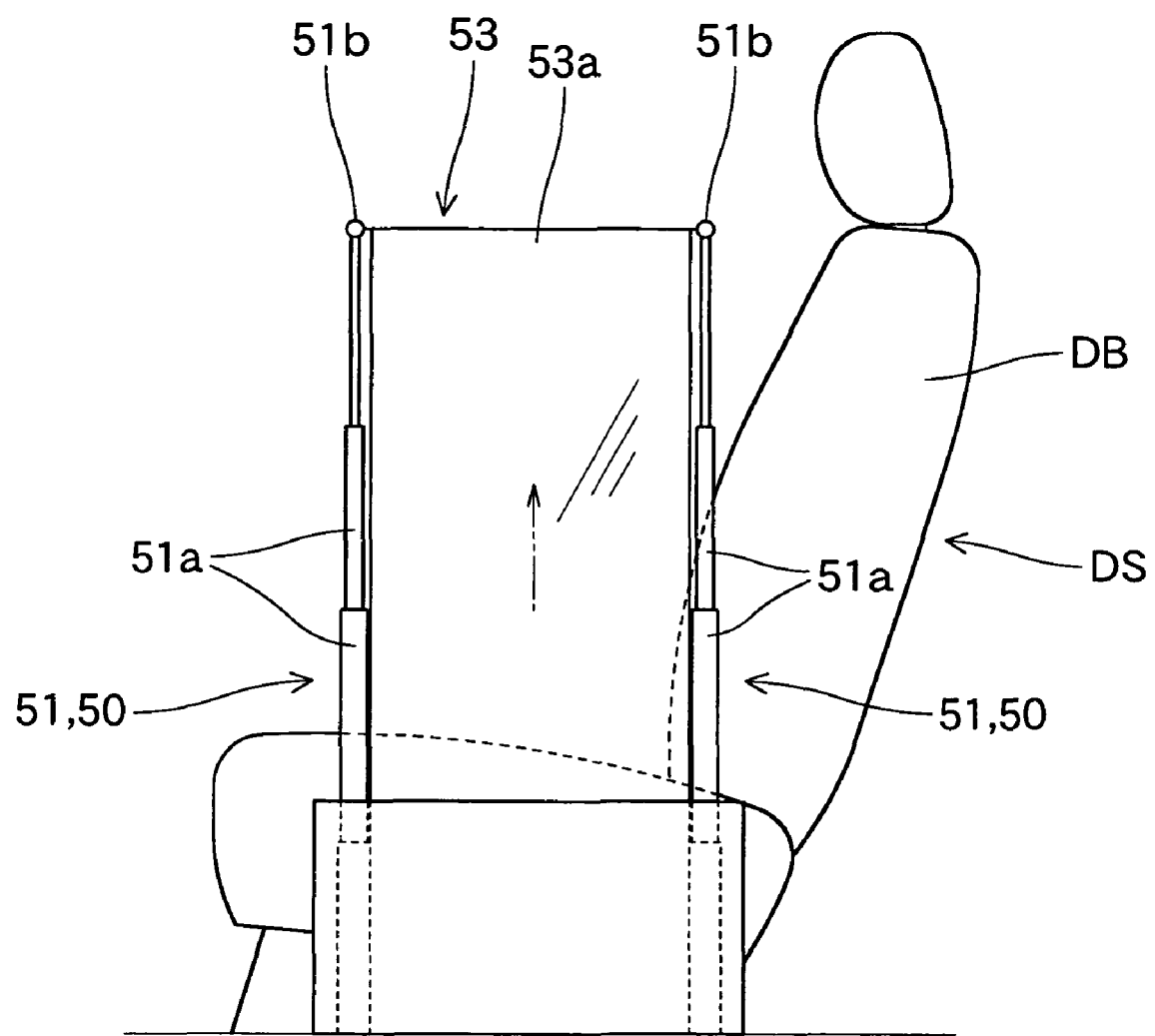
FIG. 15 is a side view of the modification of the catching body of FIG. 14 as viewed from the impacted lateral showing a shielding member at full deployment.

If this advantage does not have to be considered, the catching body may be formed of a deployment mechanism 50 shown in FIGS. 14 and 15 and described below. The mechanism 50 is located on the left side (on the side closer to the impacted lateral) of the driver's seat DS and includes a shielding member 53 and two actuators 51. The actuators 51 are located proximate front and rear ends of the seat S of the driver's seat DS on the left side of the seat DS. Each of the actuators 51 behaves like an automatic antenna mountable on a vehicle, and is configured to deploy a multi-stage (3 stage, in the illustrated embodiment) pole 51a upward by unreeling an unillustrated wire member constituted of a flexible band-shaped metal tape or the like housed inside thereof. Each of the actuators 51 is configured such that the upper end 51b region of the pole 51a is deployed proximate the upper end of the backrest DB of the driver's seat DS at full deployment. The shielding member 53 is formed into such a generally rectangular panel as to shield a space between the deployed poles 51a, and is fabricated of flexible woven fabric of polyamide, polyester yarns or the like. The shielding member 53 is connected to the upper ends 51b of the poles 51a at opposite upper ends 53a and is housed in a space between the actuators 51 in a folded-up configuration. When the actuators 51 are activated, the poles 51a are extended upward so the shielding member 53 deploys upward on the impact side (the left side) of the driver's seat DS along with the upward movement of the poles 51a as shown in FIG. 15. The poles 51a are fabricated of flexible material so they are flexed together with the shielding member 53 and allow the shielding member 53 to move sideways together with a driver after catching the driver. The material for the shielding member 53 should not be limited to woven fabric but also may be, for example, a film material of synthetic resin, net or the like as long as it is a flexible sheet material.

In the occupant protection system M described above, the support body that supports the catching body (the side airbag 16) is constituted of the first support airbag 29 and second support airbag 47 both of which are inflatable with inflation gas. Accordingly, they support the side airbag 16 in a cushioning manner and further help protect a driver DP softly via the side airbag 16. Especially in the first support airbag 29 of the foregoing embodiment, the support region 33 that supports the impact-side region (the left surface 17b of the distal end 17a) of the side airbag 16 is formed of the horizontal inflatable cell 32C inflatable thicker than the remaining horizontal cells 32A and 32B. This configuration helps the side airbag 16 to catch the driver DP even more softly.

In the occupant protection system M of the foregoing embodiment, the support region of the second support airbag 47, i.e. the upper end region 47a, is configured to overlap with the lower end region of the support region 33 of the first support airbag 29 in an inboard and outboard direction (in a left and right direction) at full deployment as shown in FIG. 13A. Describing the advantage of this configuration, at deployment, when the side airbag 16 that has caught a driver DP moves over with the upper end 17a oriented toward the left, the left surface 17b (the impact-side region) of the upper end 17a of the side airbag 16 firstly engages and is caught by an inboard surface of the support region 33 of the first support airbag 29 as indicated by double-dashed lines in FIG. 13A. However, in case the upper end region 17a of the side airbag 16 attempts to move on further toward the impacted lateral (obliquely left- and downward) while rolling back the support region 33, the upper end region 17a of the side airbag 16 is received by the upper end region 47a of the second support airbag 47 located on the inboard side of the lower end region of the support region 33 as shown in FIG. 13B. That is, the support body of the foregoing embodiment includes a two-stage support; a primary support body 33, of the first support airbag 29, and a fallback or sub support body formed of the upper end region 47a of the second support airbag 47, and thus assuring the protection of the driver DP.

Although the foregoing embodiment has been described as includes two support airbags, the protection system of the invention may include only either one of the support airbags on condition of assuring the support of the upper end region of the side airbag. The housing location of the support airbag should not be limited to the upper periphery of the window or the backrest of the front passenger's seat. For example, the support airbag may be housed inside a door trim for upward deployment. Moreover, if not considering soft catching of a driver, the support body, by way of example, may be formed of a plate-shaped supporting element located on the side of a front passenger's seat close to the impacted lateral for deployment toward the interior of vehicle to support the side airbag. Such a supporting element does not necessarily have to be configured to make a deployment upon activation. It will also be appreciated that the supporting element is preliminarily located on the impact side of the front passenger's seat for supporting the side airbag. Furthermore, the supporting element may be formed of part of the vehicle body structure such as a door trim.

Since the side airbag 16 of the foregoing embodiment includes the head restraining region 18 that restrains a head DH of the driver DP, the side airbag 16 itself can protect the head DH at deployment. Without considering this advantage, the side airbag may be configured as to cover up to the shoulder of the driver, without a head restraining region.

Moreover, the occupant protection system M of the foregoing embodiment is so configured that the first support airbag 29 deploys downward from the housing whereas the second support airbag 47 deploys forward from the housing, i.e. such that the deployment directions of the support airbags 29 and 47 intersect with that of the side airbag 16 (i.e., upward) from the housing. This configuration helps prevent the distal end 17a of the side airbag 16, which moves obliquely downward and leftward after catching a driver DP, from engaging distal ends of the first support airbag 29 and second support airbag 47 while moving adversely to (i.e. moving from the distal ends to the root ends of) the deployment directions of the first and second support airbags 47. More specifically, in the foregoing embodiment, the upper end 17a of the side airbag 16 moves along the deployment direction of the first support airbag 29, i.e. moves from the root side (upper side) to the lower side of the deployment direction of the first support airbag 29, before engaging the support region 33 located at the lower end 30a of the first support airbag 29. With respect to the second support airbag 47, the upper end 17a of the side airbag 16 engages the upper end region 47a of the airbag 47, which is located away from the distal end (front end), facing downward. That is, the upper end 17a of the side airbag 16 does not move against the deployment directions of the first and second support airbags 29 and 47 and bump against the airbags 29 and 47 in that state, in such a manner as to buckle or compress the airbags 29 and 47. As a result, it is prevented that the first and second support airbags 29 and 47 deform or buckle upon contacting the upper end 17a of the side airbag 16 and fail to support the upper end 17a, such that the airbags 29 and 47 support the side airbag 16 properly.

If the configuration of the system is such that the deployment direction of the support body from the housing and that of the catching body from the housing is the same, when the distal end of the catching body moves toward the impacted lateral after catching a distant-side occupant, it comes to engage the distal end of the support body while making a movement from the distal end to the root end of the deployment direction of the support body. In such an instance, the support body is likely to buckle or compress from the distal end and cannot support the distal end of the catching body in a stable manner. However, if not considering such a point and if the support body is configured thick enough to support the distal end of the catching body, the deployment direction of the support body may be the same as that of the catching body.

In the occupant protection system M of the embodiment described above, the housing or case 9 of the side airbag 16 is located at a low position between the front passenger's seat PS and driver's seat DS such that the side airbag 16 is deployable upward from the case 9, and the side airbag 16 is fixed to the case 9 at the lower end 17c while leaving the upper end 17a free for swinging in a left and right direction. That is, the side airbag 16 is configured swingable about the lower end 17c. Thus, when receiving a driver DP moving in a tilting manner toward the left, the side airbag 16 tilts as well along with the driver DP such that the distal end 17a is directed toward the left (toward the impacted lateral), thus receiving a generally entire area of the left side of the driver DP.

The location of the housing of the side airbag 16 should not be limited to those described in the foregoing embodiment. For example, the console box 3 itself can house the side airbag 16, or the airbag 16 maybe housed in a left end region (impact-side end region) of the seat S of the driver's seat DS, or in a right end region (distant-side end region) of the seat of the front passenger's seat PS for upward deployment. Furthermore, without considering the advantages of the upward-deployment configuration, the location of the housing of the side airbag may be a left end region (impact-side end region) of the backrest DB of the driver's seat DS or a right end region (distant-side end region) of a backrest of the front passenger's seat PS so the side airbag deploy forward, on condition that the side airbag is supported by the support airbag for catching a driver. Still moreover, the side airbag may be located inside the ceiling so as to be deployable downward.

The foregoing embodiments have been described as applied to a system that protects a driver seated in a driver's seat when a vehicle is impacted on the side adjacent the front passenger's seat (on the left side). Of course, however, the invention can also be applied to such a system that protects an occupant seated in a front passenger's seat when a vehicle is impacted on the side adjacent the driver's seat (on the right side). Furthermore, the system of the invention may be configured to protect an occupant seated in a backseat.

What is claimed is:

1. An occupant protection system mountable on a vehicle having a row of seats arranged along a left and right direction and operable when the vehicle is impacted on a lateral, the system comprising:
    a catching body for catching a distant-side occupant seated on a distant seat that is located away from the lateral which has been impacted, the catching body being housed in a housing located between the distant seat and a near-by seat that is located close to the impacted lateral for deployment on a side of the distant seat close to the impacted lateral, the catching body including a fixed end fixed to the housing and a distal end acting as a free end swingable in a left and right direction; and
    a support body located on a side of the near-by seat close to the impacted lateral, the support body being configured to support the catching body when the catching body swings toward the impacted lateral upon receiving the distant-side occupant,
    wherein
    the housing of the catching body is located at a low position between the near-by seat and the distant seat such that the catching body is deployable upward from the housing;
    the catching body is comprised of an airbag inflatable with inflation gas;
    the support body is comprised of a first support airbag and a second support airbag, the first and second support airbags being housed in a housing and inflatable with inflation gas for deployment on the side of the near-by seat close to the impacted lateral;
    the system is configured such that a deployment direction of the support body from the housing intersects with that of the catching body from the housing as viewed from a lateral of the vehicle;
    the first support airbag is configured to deploy downward from the housing and support the catching body at a lower end region thereof;
    the second support airbag is configured to deploy forward or rearward from the housing between the first support airbag and the catching body and support the catching body at an upper end region thereof; and
    the lower end region of the first support airbag and the upper end region of the second support airbag overlap with each other in an inboard and outboard direction at deployment.

2. The occupant protection system of claim 1 wherein the catching body is comprised of an airbag inflatable with inflation gas.

3. The occupant protection system of claim 2 wherein the support body is comprised of a third support airbag that is housed in a housing and inflatable with inflation gas for deployment on the side of the near-by seat close to the impacted lateral.

4. The occupant protection system of claim 3 wherein the system is configured such that a deployment direction of the support body from the housing intersects with that of the catching body from the housing as viewed from a lateral of the vehicle.

5. The occupant protection system of claim 1 wherein the catching body includes a head restraining region that is capable of restraining a head of the distant-side occupant.

6. The occupant protection system of claim 1 wherein:

the first supporting airbag includes a horizontal cell arranged along an anteroposterior direction at a lower end thereof;

the horizontal cell supports the catching body when the catching body swings toward the impacted lateral upon receiving the distant-side occupant.

* * * * *